United States Patent [19]
Ochi et al.

[11] Patent Number: 5,770,161
[45] Date of Patent: Jun. 23, 1998

[54] FLUE GAS TREATING SYSTEM

[75] Inventors: Eiji Ochi, Tokyo; Toru Takashina; Takao Sodeshita, both of Hiroshima, all of Japan

[73] Assignee: Mitsubishi Jukogyo Kabushiki Kaisha, Tokyo, Japan

[21] Appl. No.: 564,409

[22] Filed: Nov. 29, 1995

[30] Foreign Application Priority Data

Apr. 21, 1995 [JP] Japan .................................. 7-096773

[51] Int. Cl.$^6$ .............................. B01D 47/00; G05D 7/00
[52] U.S. Cl. ......................... 422/111; 422/172; 422/173; 55/228
[58] Field of Search .............................. 422/62, 105, 108, 422/110, 111, 114, 115, 172, 173, 109; 423/242.1, 242.2, 243.01, 243.03, 243.09, DIG. 5; 55/228

[56] References Cited

U.S. PATENT DOCUMENTS

| | | | |
|---|---|---|---|
| 3,899,294 | 8/1975 | Magiros | 422/108 |
| 4,094,959 | 6/1978 | Ball et al. | 423/359 |
| 4,100,266 | 7/1978 | Smith | 423/574 R |
| 4,322,392 | 3/1982 | Gleason et al. | 423/242 |
| 4,431,618 | 2/1984 | Boward, Jr. et al. | 423/242 |
| 4,687,649 | 8/1987 | Kuroda et al. | 423/242 |
| 4,755,366 | 7/1988 | Schwartzbach | 423/235 |

FOREIGN PATENT DOCUMENTS

| | | |
|---|---|---|
| 0 038 961 A1 | 11/1981 | European Pat. Off. . |
| 0 244 346 A3 | 11/1987 | European Pat. Off. . |
| 0 246 758 A3 | 11/1987 | European Pat. Off. . |

*Primary Examiner*—Nina Bhat
*Attorney, Agent, or Firm*—Bell Seltzer Intellectual Property Law Group

[57] ABSTRACT

A flue gas treating system including a gas-gas heater and/or a dust collector, and a wet flue gas desulfurization apparatus, characterized in that the flue gas treating system is equipped with addition means for adding an alkaline agent to an absorbent slurry, a pH detector for detecting the pH of the slurry, gas-gas heater operational state detection means, dust collector operational state detection means, and alkaline agent addition control means for controlling the amount of alkaline agent added in response to signals from the pH detector, the gas-gas heater operational state detection means and the dust collector operational state detection means, so that the pH and calcium compound concentration of the absorbent slurry can be controlled.

5 Claims, 5 Drawing Sheets

FIG. I

FLUE GAS TREATING SYSTEM

BACKGROUND OF THE INVENTION

1. Field of the Invention

This invention relates to a flue gas treating system wherein dust and sulfur dioxide present in flue gas discharged from a coal-fired boiler or the like are removed by use of a wet flue gas desulfurization apparatus based on the lime-gypsum method.

2. Description of Related Art

Conventionally, wet flue gas desulfurization systems, especially for use with coal-fired boilers, have posed problems in that impurities (such as HF, HCl and Al) present in flue gas exert an adverse influence on desulfurization performance (i.e., the activity of the absorbent), the quality of gypsum obtained as a by-product, and the like. In order to solve these problems, the pH of the absorbent slurry is maintained at 5 or above by the addition of an alkaline agent (e.g., NaOH) as described, for example, in Japanese Patent Laid-Open Nos. 102967/'78 and 124530/'80. It is known that the impurities are accumulated as a result of dissolution in the slurry and cause a kind of masking phenomenon in which they cover the surfaces of the absorbent particles to reduce the activity of the absorbent (i.e., its reactivity with sulfur dioxide) and thereby deteriorate the quality of gypsum. However, these impurities becomes much less soluble in the slurry at a pH level of 5 or above, and this is the reason why the above-described method of maintaining the pH at 5 or above by the addition of an alkaline agent is employed.

FIG. 4 is a schematic view illustrating the overall construction of a conventional flue gas treating system using such a flue gas desulfurization apparatus, and FIG. 5 is a diagram showing the method for controlling the feed rate of an absorbent (limestone) as employed in this desulfurization apparatus. In the system of FIG. 4, flue gas emerging from a coal-fired boiler 1 is freed of dust such as fly ash in an electrical dust precipitator (ESP) 2, and then conducted through an inlet duct 3 into a flue gas desulfurization apparatus 10 where sulfur dioxide is removed therefrom. Thereafter, the flue gas is conveyed through an outlet duct 4 and an exhaust duct 5 to a stack 6 and then discharged into the atmosphere from this stack 6.

In inlet duct 3, there is provided a desulfurization fan 7 for pressurizing the flue gas and blowing it into an absorption tower 11 which will be described later. Moreover, a gas-gas heater (hereinafter referred to as GGH) 8 is installed in such a way that both inlet duct 3 and outlet duct 4 pass therethrough. This GGH 8 is a kind of heat exchanger and serves to cool untreated flue gas to a temperature suitable for desulfurization treatment and, at the same time, to add the heat removed from untreated flue gas to the treated flue gas and heat it for the purpose of preventing the formation of white smoke or promoting the diffusion thereof or of preventing the corrosion of downstream equipment (such as ducts). In the case of a GGH of the rotary regenerator type, for example, it should be suitably cleaned to prevent clogging of the elements.

In this case, desulfurization apparatus 10 is of the tank oxidation type and comprises an absorption tower 11 having, in its lower part, a tank 12 for receiving a calcium compound-containing slurry (comprising a limestone-containing slurry in this case and hereinafter referred to as the absorbent slurry), a circulating pump 13 for supplying the absorbent slurry within tank 12 to a flue gas inlet section 11a in the upper part of absorption tower 11 and bringing it into contact with flue gas, a stirring rod 14 supported within tank 12 of absorption tower 11 and rotated horizontally by a motor (not shown), and a blower 15 for blowing air into tank 12 for purposes of oxidation. Thus, air is bubbled into the absorbent slurry within tank 12, for example, from air supply pipes (not shown) disposed at the bottom thereof and brought into efficient contact with the absorbent slurry having sulfur dioxide absorbed therein, so that this absorbent slurry is completely oxidized to form gypsum.

More specifically, in this apparatus, untreated flue gas is introduced into flue gas inlet section 11a of absorption tower 11 and brought into contact with the absorbent slurry injected from header pipes 16 by means of circulating pump 13, so that sulfur dioxide present in the untreated flue gas is removed by absorption. The treated flue gas is then discharged from a flue gas outlet section 11b. The absorbent slurry injected from header pipes 16 flows downward through a packing material 17 while absorbing sulfur dioxide, and enters tank 12 where it is oxidized by contact with a large number of air bubbles produced as a result of bubbling while being stirred with stirring rod 14, and then undergoes a neutralization reaction to form gypsum. Flue gas outlet section 11b of absorption tower 11 is provided with a mist eliminator 18, by which mist in the treated flue gas (i.e., mist formed from the slurry within tank 12) is removed and returned to tank 12. The principal reactions occurring in the course of these treatments are represented by the following reaction formulas (1) to (3).

(Flue gas inlet section of absorption tower)

$$SO_2 + H_2O \rightarrow H^+ + HSO_3^- \tag{1}$$

(tank)

$$H^+ + HSO_3^- + \tfrac{1}{2}O_2 \rightarrow 2H^+ + SO_4^{2-} \tag{2}$$

$$2H^+ + SO_4^{2-} + CaCO_3 + H_2O \rightarrow CaSO_4 \cdot 2H_2O + CO_2 \tag{3}$$

Thus, the slurry within tank 12 comes to have suspended therein gypsum ($CaSO_4 \cdot 2H_2O$) and a small amount of limestone ($CaCO_3$) used as absorbent. This slurry is withdrawn by means of a slurry pump 20, concentrated and then fed to a solid-liquid separator 21 where it is filtered to recover gypsum 22 having a low water content (usually of about 10%). On the other hand, the filtrate (consisting largely of water) from solid-liquid separator 21 is conveyed to a filtrate tank 23 where makeup water W is added thereto as required, and then to an absorbent slurry tank 25 by means of a pump 24. In this absorbent slurry tank 25, the filtrate is mixed with limestone 27 fed from a limestone silo 26 and the resulting mixture is recycled to tank 12 as a part of the absorbent slurry by means of a slurry pump 28.

The pipeline connecting filtrate tank 23 to absorbent slurry tank 25 is provided with a flow control valve 31. By the action of a flow controller 32 for controlling this flow control valve 31, a predetermined proportion of water is supplied to absorbent slurry tank 25 in response to the feed rate of limestone 27 from silo 26, so that an absorbent slurry having a predetermined water content is formed within absorbent slurry tank 25. Moreover, absorbent slurry tank 25 is provided with a level detector 33. By the action of a level controller 35 for controlling a dispenser 34 of silo 26 in response to a signal from this level detector 33, limestone 27 is fed so that the liquid level within absorbent slurry tank 25 always remains substantially constant.

Furthermore, the pipeline for supplying the absorbent slurry from absorbent slurry tank 25 to tank 12 by means of slurry pump 28 is provided with a flow control valve 36. By the action of a flow controller 37 for controlling this flow control valve 36, the feed rate of the absorbent slurry supplied to tank 12 is controlled. More specifically, as shown in FIG. 4, flow controller 37 is electrically connected with a pH detector 38 for detecting the pH of the slurry within tank 12, an inlet concentration detector 39 for detecting the sulfur dioxide ($SO_2$) concentration of the flue gas introduced into absorption tower 11, and a boiler load detector 40 for the load of boiler 1 (or the flow rate of air in boiler 1 or the flow rate of gas to be treated). Thus, the necessary feed rate of the absorbent (comprising limestone in this case) is calculated on the basis of the outputs of these detectors (i.e., inlet $SO_2$ concentration A, boiler load B and absorption tower tank pH value C), and the degree of opening of flow control valve 36 is regulated so that the feed rate of the absorbent slurry will correspond to the calculated value.

Calculation of the necessary feed rate of the absorbent in flow controller 37 has been performed, for example, in the manner shown in FIG. 5. Specifically, according to a predetermined function f, a basic absorbent feed rate f(x) based on the flow rate of sulfur dioxide is first calculated from a value x ($x=A \cdot B$) obtained by multiplying inlet $SO_2$ concentration A by boiler load B. On the other hand, an additional absorbent feed rate g is calculated from the deviation of absorption tower tank pH value C from a preset pH value P (P=5 to 6). Then, a final absorbent flow rate defining a control target flow rate Q [$Q=f(x)+g$] is calculated by adding this additional absorbent feed rate g to basic absorbent feed rate f(x).

In this system, f(x) is defined, for example, as $f(x)=a \cdot x$ and the proportionality constant a is determined, for example, so that basic absorbent feed rate f(x) represents a stoichiometric equivalent of the absorbent which reacts with the amount of $So_2$ determined from value x. On the other hand, additional absorbent feed rate g is calculated from the deviation and its differential. For example, when absorption tower tank pH value C has fallen below the preset pH value (P =5 to 6), a value of additional absorbent feed rate g corresponding to a proportional sensitivity is calculated and included in control target flow rate Q. In this process, as the rate of fall of absorption tower tank pH value C (i.e., the differential of the deviation) is increased, the value of additional absorbent feed rate g becomes correspondingly greater. Alternatively, instead of being determined from absorption tower tank pH value C, additional absorbent feed rate g may be determined so that, as shown in parentheses in FIG. 5, the absorption tower outlet $SO_2$ concentration is maintained at a target value on the basis of the deviation of the detected value of the absorption tower outlet $SO_2$ concentration from a preset value.

Moreover, an alkaline agent (e.g., NaOH) within an alkaline agent tank 42 is supplied to tank 12 of absorption tower 11 by means of a pump 41. In this system, pump 41 is designed to supply the alkaline agent at a fixed flow rate, and its starting and stopping or regulation of its delivery rate during operation has conventionally been performed suitably according to the judgment of the operator. Instead of supplying an alkaline agent directly to tank 12 as shown in FIG. 4, the addition of an alkaline agent may be carried out, for example, by adding it to absorbent slurry tank 25 and supplying it in admixture with the absorbent slurry, as disclosed in the aforementioned Japanese Patent Laid-Open No. 102967/'78. In either case, starting and stopping of the addition of an alkaline agent or regulation of its amount added has conventionally been performed according to the judgment (based on experience and the like) of the operator who manages the operation of the flue gas treating system.

More specifically, it has been conventional practice for the operator to always monitor, for example, the absorption tower tank pH value or the absorption tower outlet $SO_2$ concentration, and perform an operation for starting the addition of an alkaline agent or increasing the amount of alkaline agent added as soon as the absorption tower tank pH value has fallen below 5 or the absorption tower outlet $SO_2$ concentration has become lower than a target value.

In the conventional desulfurization apparatus, in order to prevent unreacted limestone from mixing in gypsum obtained as a by-product, sulfuric acid may be added to the slurry after treatment and reacted with any unreacted limestone as described, for example, in Japanese Patent Laid-Open No. 97597/'76, though not shown in FIG. 4. Moreover, the amount of water present in tank of absorption tower 11 is regulated, for example, by providing a pipeline for supplying water within filtrate tank 23 directly to tank 12 and controlling the flow rate of water in this pipeline.

In the conventional flue gas desulfurization apparatus, as described above, the absorption tower tank pH value is maintained at 5 or above by adding an alkaline agent or controlling the feed rate of the absorbent on the basis of the detected absorption tower tank pH value, so as to prevent a reduction in the activity of the absorbent (or a reduction in the degree of desulfurization) and a deterioration in the quality of gypsum due to the impurities. However, when it is attempted to effectively prevent a reduction in activity due to impurities while minimizing the consumption of the alkaline agent and the absorbent, and thereby improve or maintain desulfurization performance and the quality of gypsum, this conventional flue gas desulfurization apparatus still involves the following problems.

(1) When the absorption tower tank pH value or the absorption tower outlet $SO_2$ concentration has fallen below a predetermined value, an operation for starting the addition of an alkaline agent or increasing its amount added is performed by the operator who has recognized this fact. Accordingly, in a period of time after an operation for starting the addition of an alkaline agent or increasing its amount added is performed and before its effect is manifested, a temporary reduction in performance occurs unavoidably. In order to solve this problem, an operating method involving the continuous addition of an alkaline agent at a rather high flow rate has been employed. In this case, however, a large amount of an alkaline agent is required, resulting in an increase in the operation cost of the desulfurization apparatus.

(2) Conventionally, when the operator confirms that the absorption tower tank pH value has fallen, he starts the addition of an alkaline agent or regulates the amount of alkaline agent added according to his own judgment. Consequently, it has been possible that, depending on the skill of the operator or the like, the unnecessary addition of an alkaline agent waste a large amount of the alkaline agent or the operation is continued for a long time at a reduced activity level. In other words, since the conditions causing a reduction in performance have not been made clear, there has been an undesirable possibility that an alkaline agent is not added until a reduction in activity is observed, or an alkaline agent is added for a long time though the activity is not actually reduced.

(3) As described above, it has also been conventional practice to increase the feed rate of the absorbent unconditionally when the absorption tower tank pH value has fallen. As a result, a large amount of the absorbent is supplied even where the reduction in activity is not necessarily caused by a shortage of the absorbent. This is problematic in that the consumption f the absorbent increases wastefully and brings about an increased operation cost and in that a large amount of unreacted absorbent remains in the slurry after treatment and deteriorates the quality of gypsum obtained as a by-product. In such a case, sulfuric acid may be added to the slurry after treatment, as described above, for the purpose of securing a high quality of gypsum. However, this method requires the addition of sulfuric acid and also brings about an increased operation cost.

SUMMARY OF THE INVENTION

In view of the above-described technical level of the prior art, an object of the present invention is to provide a flue gas treating system in which the activity of the absorbent (i.e., high desulfurization performance) can be effectively and adequately maintained by using a small amount of an alkaline agent, a high degree of desulfurization can be achieved at a low operation cost by accurately regulating the required amounts of the absorbent and the like, and high-quality gypsum can be recovered.

In order to accomplish the above object, the present inventors first analyzed various factors causing a reduction in the performance of the desulfurization apparatus and have found that, in some restricted special operational states (or unsteady operational states) such as a cleaning operation for cleaning the elements of the gas-gas heater and a stoppage of the dust collector due to an electric charge trip, the amount of impurities entering the absorption tower without being removed from the untreated flue gas increases sharply to cause a marked reduction in the activity of the absorbent (or desulfurization performance). Moreover, the conventionally employed operating method has proved to be such that, even if such an unsteady operation state is created, the addition of an alkaline agent is not carried out until the operator recognizes that the pH value of the slurry within the tank of the absorption tower or the $SO_2$ concentration at the outlet of the absorption tower has fallen below a predetermined value, or an alkaline agent is always added in a large amount required only in such unsteady operational states. The present invention has been completed on the basis of these facts.

According to various aspects of the present invention, there are provided:

(1) a flue gas treating system including a gas-gas heater for heating the treated flue gas by use of the heat of untreated flue gas containing sulfur dioxide, and a wet flue gas desulfurization apparatus in which the flue gas leaving the gas-gas heater is introduced into an absorption tower and brought into contact with a calcium compound-containing slurry to remove the sulfur dioxide by absorption and form gypsum which comprises: addition means for adding an alkaline agent to the slurry; a pH detector for detecting the pH of the slurry within the absorption tower; gas-gas heater operational state detection means for detecting the operational state of the gas-gas heater; and alkaline agent addition control means for controlling the amount of alkaline agent added in response to signals from the pH detector and the gas-gas heater operational state detection means; so that when detection of the pH of the slurry within the absorption tower and of the operational state of the gas-gas heater reveals that the pH of the slurry has fallen below a preset target value or the operational state of the gas-gas heater has become an unsteady operational state causing an increase in the amount of impurities present in the untreated flue gas, at least a predetermined constant flow rate of the alkaline agent can be added to the slurry until the pH of the slurry rises to the target value and the unsteady operational state ceases;

(2) a flue gas treating system including a dust collector for removing dust present in flue gas containing sulfur dioxide, and a wet flue gas desulfurization apparatus in which the flue gas dedusted by the dust collector is introduced into an absorption tower and brought into contact with a calcium compound-containing slurry to remove the sulfur dioxide by absorption and form gypsum which comprises: addition means for adding an alkaline agent to the slurry; a pH detector for detecting the pH of the slurry within the absorption tower; dust collector operational state detection means for detecting the operational state of the dust collector; and alkaline agent addition control means for controlling the amount of alkaline agent added in response to signals from the pH detector and the dust collector operational state detection means; so that when detection of the pH of the slurry within the absorption tower and of the operational state of the dust collector reveals that the pH of the slurry has fallen below a preset target value or the operational state of the dust collector has become an unsteady operational state causing an increase in the amount of impurities present in the untreated flue gas, at least a predetermined constant flow rate of the alkaline agent can be added to the slurry until the pH of the slurry rises to the target value and the unsteady operational state ceases;

(3) A flue gas treating system including a gas-gas heater for heating the treated flue gas by use of the heat of untreated flue gas containing sulfur dioxide, a dust collector for removing dust present in the untreated flue gas, and a wet flue gas desulfurization apparatus in which the flue gas having been passed through the gas-gas heater and the dust collector is introduced into an absorption tower and brought into contact with a calcium compound-containing slurry to remove the sulfur dioxide by absorption and form gypsum which comprises: addition means for adding an alkaline agent to the slurry; a pH detector for detecting the pH of the slurry within the absorption tower; gas-gas heater operational state detection means for detecting the operational state of the gas-gas heater; dust collector operational state detection means for detecting the operational state of the dust collector; and alkaline agent addition control means for controlling the amount of alkaline agent added in response to signals from the pH detector, the gas-gas heater operational state detection means and the dust collector operational state detection means; so that when detection of the pH of the slurry within the absorption tower and of the operational states of the gas-gas heater and the dust collector reveals that the pH of the slurry has fallen below a preset target value or the operational state of the gas-gas heater and the dust collector has become an unsteady operational state causing an increase in the amount of impurities present in the untreated flue gas, at least a predetermined constant flow rate of the alkaline agent can be added to the slurry until the pH of the slurry rises to the target value and the unsteady operational state ceases;

(4) a flue gas treating system as described in any one of the above paragraphs (1) to (3) wherein the flue gas treating system is further equipped with feed rate regulation means for regulating the feed rate of the calcium compound contained in the slurry, calcium compound concentration detection means for detecting the calcium compound concentration of the slurry within the absorption tower, and calcium compound feed rate control means for controlling the feed rate of the calcium compound in response to a signal from the calcium compound concentration detection means, so that when the value detected by the calcium compound concentration detection means has fallen below a preset target value, the feed rate of the calcium compound can be increased until the detected value rises to the target value; and (5) a flue gas treating system as described in any one of the above paragraphs (1) to (3) wherein the flue gas treating system is further equipped with feed rate regulation means for regulating the feed rate of the calcium compound contained in the slurry, sulfur dioxide concentration detection means for detecting the sulfur dioxide concentration of the treated flue gas, and calcium compound feed rate control means for controlling the feed rate of the calcium compound in response to a signal from the sulfur dioxide concentration detection means, so that when the value detected by the sulfur dioxide concentration detection means has exceeded a preset target value, the feed rate of the calcium compound can be increased until the detected value becomes equal to or less than the target value.

In the treatment of flue gas by the flue gas treating system of the present invention, when the pH detector detects that the pH of the slurry within the absorption tower has fallen below a preset target value or the operational state detection means detects that the operational state of the GGH or dust collector has become an unsteady operational state causing an increase in the amount of impurities present in the untreated flue gas entering the absorption tower, the addition means for adding an alkaline agent to the slurry is instantaneously activated under the control of the addition control means. Thus, at least a predetermined constant flow rate of the alkaline agent is automatically added to the slurry until the pH of the slurry within the absorption tower rises to the target value and the unsteady operational state ceases.

Consequently, when the operational state of the GGH or dust collector has become an unsteady operational state as described above, the addition of at least a constant flow rate of the alkaline agent is instantaneously started regardless of the pH value of the slurry within the absorption tower. Thus, before the unsteady operational state causes a marked reduction in performance (i.e., before the pH of the slurry within the absorption tower or the $SO_2$ concentration at the outlet of the absorption tower shows a decreasing tendency), the alkaline agent is added in advance without rely on the judgment of the operator.

Similarly, when the pH of the slurry within the absorption tower has fallen below the target value, the addition of at least a constant flow rate of the alkaline agent is also started regardless of the operational state of the GGH or dust collector. Thus, even if a reduction in activity is caused by a factor other than the unsteady operational state (for example, an increase in the amount of impurities present in flue gas due to the type of fuel used or the like), the alkaline agent is automatically added as soon as the pH of the slurry within the absorption tower has fallen, without relying on the judgment of the operator.

Moreover, such addition of the alkaline agent is continued until the pH of the slurry within the absorption tower rises to the target value and the unsteady operational state ceases. Accordingly, no matter what is the factor causing the addition of the alkaline agent, the addition of the alkaline agent is surely continued as long as the condition requiring the addition of the alkaline agent exists.

Where the flue gas treating system is further equipped with feed rate regulation means for regulating the feed rate of the calcium compound used as absorbent, and feed rate control means which, when the value detected by detection means for detecting the calcium compound concentration of the slurry within the absorption tower has fallen below a present target value or the value detected by detection means for detecting the sulfur dioxide concentration of the treated flue gas has exceeded a preset target value, controls the feed rate regulation means to increase the feed rate of the calcium compound until the detected value becomes equal to or less than the target value, the feed rate of the absorbent can always be maintained at a necessary minimum level on the basis of the calcium compound concentration of the slurry within the absorption tower or the sulfur dioxide concentration of the treated flue gas, independently of the pH value of the slurry within the absorption tower.

That is, in the conventional system wherein the feed rate of the absorbent is regulated on the basis of the pH value of the absorption tower tank, a fall of the pH value of the absorption tower tank results in not only the addition of the alkaline agent, but also an unconditional increase in the feed rate of the absorbent. Consequently, if the fall of the pH value is not necessarily caused by a shortage of the absorbent, the absorbent will be supplied wastefully. This disadvantage can be overcome by controlling the feed rate of the absorbent on the basis of the calcium compound concentration of the slurry within the absorption tower or the sulfur dioxide concentration of the treated flue gas.

PREFERRED EMBODIMENTS

Figure 1:
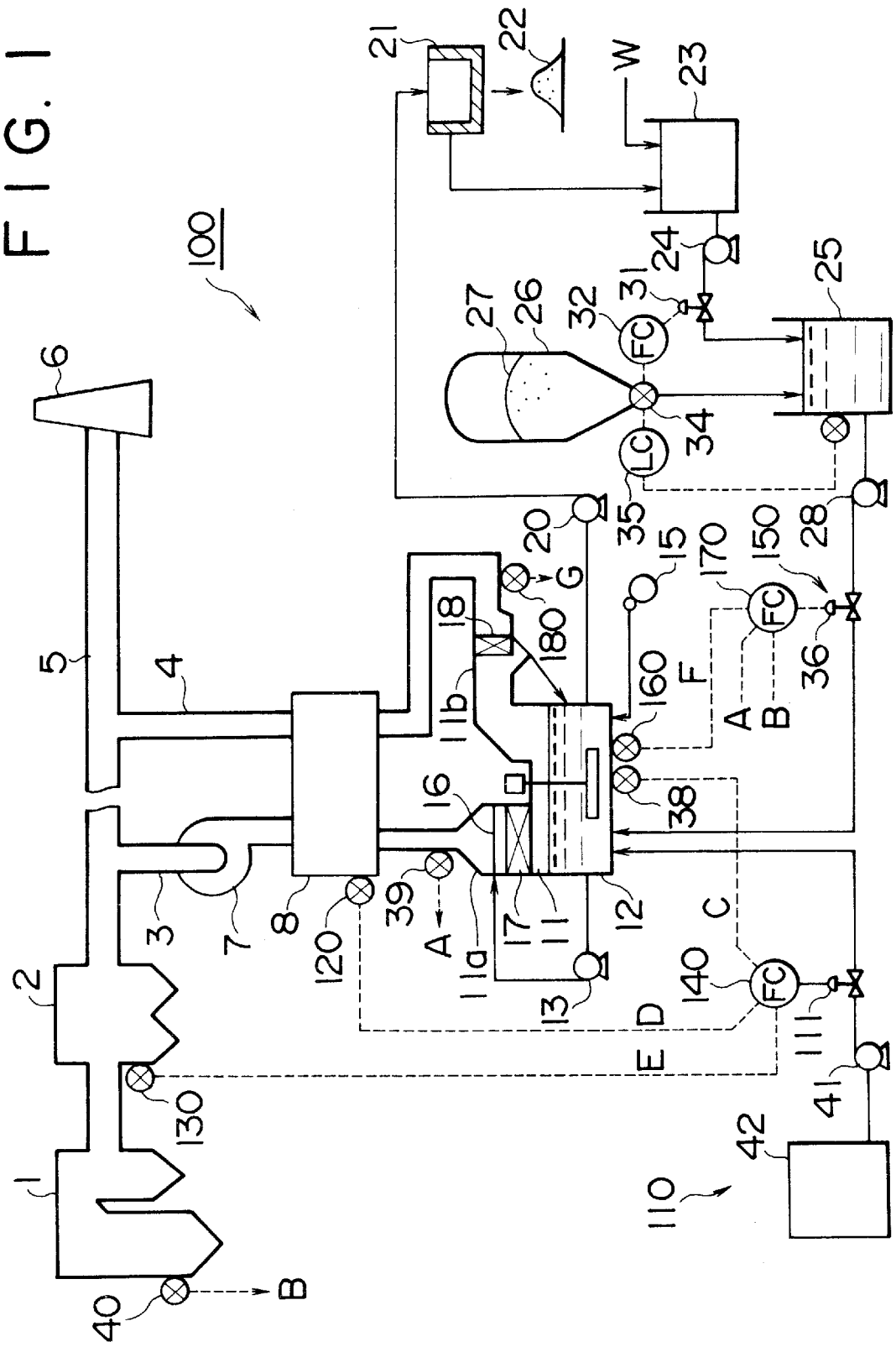
FIG. 1 is a schematic view illustrating the overall construction of a flue gas treating system in accordance with one embodiment of the present invention.

One embodiment of the present invention is more specifically described hereinbelow. In these FIG. 1 to 3, elements similar to those included in the conventional flue gas treating system illustrated in FIG. 4 are designated by the same reference numerals and the explanation thereof is omitted.

The flue gas treating system illustrated in FIG. 1 has a wet flue gas desulfurization apparatus 100 comprising an absorption tower 11 and other elements which are similar to those included in the conventional system. As contrasted with the conventional system, this flue gas treating system is equipped with addition means 110 for adding an alkaline agent to tank 12 of absorption tower 11, GGH operational state detection means 120 for detecting the operational state of GGH 8, dust collector operational state detection means 130 for detecting the operational state of electrical dust precipitator 2, addition control means 140 for controlling the addition means 110, absorbent feed rate regulation means 150 for regulating the feed rate of limestone (or calcium compound) used as absorbent, limestone concentration detection means (or calcium compound concentration detection means) 160 for detecting the calcium compound concentration of the slurry within the absorption tower, and feed rate control means 170 for controlling the feed rate regulation means 150 in response to the value F detected by the calcium compound concentration detection means or the like.

Referring to FIG. 1, wet flue gas desulfurization apparatus 100 in accordance with this embodiment of the present invention is composed of elements other than boiler 1, electrical dust precipitator 2, inlet duct 3, outlet duct 4, exhaust duct 5, stack 6, desulfurization fan 7, GGH 8 and equipment incidental thereto. However, wet flue gas desulfurization apparatus 100 may sometimes include, for example, desulfurization fan 7 and GGH 8.

In this case, addition means 110 consists of an alkaline agent tank 42, a pump 41 for injecting an alkaline agent, a flow control valve 111 installed in the pipeline connecting pump 41 to tank 12 of absorption tower 11, and a driving device for driving this flow control valve, such as a solenoid or a combination of a compressed air source and a pneumatic actuator (not shown). As the alkaline agent, there may be used, for example, hydroxides of lithium, sodium, potassium, rubidium, cesium, beryllium, magnesium, calcium, strontium and barium.

GGH operational state detection means 120 for detecting the operational state of GGH 8 produces a detection signal D at least when the operational state of GGH 8 has become an unsteady operational state causing an increase in the amount of impurities present in the untreated flue gas entering absorption tower 11, such as one of dedusting, cleaning and cleaning water-receiving operations. Specifically, this GGH operational state detection means 120 may comprise, for example, a controller for GGH 8 itself which produces a signal according to its operational state, and need not necessarily be installed on the body of GGH 8 as shown in FIG. 1.

Dust collector operational state detection means 130 for detecting the operational state of electrical dust precipitator 2 produces a detection signal E at least when a stoppage of electrical dust precipitator 2 due to an electric charge trip or an abnormally high outlet soot/dust concentration is detected. Again, this dust collector operational state detection means 130 need not necessarily be installed on the body of electrical dust precipitator 2 as shown in FIG. 1.

Addition control means 140 has the function of calculating the supply flow rate of the alkaline agent on the basis of a detection signal C from pH detector 38 and performing the addition of this flow rate of the alkaline agent by controlling pump 41 and flow control valve 111 of addition means 110 in response to detection signals C, D and E from pH detector 38, GGH operational state detection means 120 and dust collector operational state detection means 130. For example, this addition control means 140 may consist of an arithmetic unit such as a microcomputer or a logic sequence circuit, and a driver circuit for applying a driving current to the driving device of addition means 110 under the command of the arithmetic unit. In this addition control means 140, calculation of the supply flow rate of the alkaline agent and determination of the addition time are performed, for example, in the manner shown in FIG. 2.

Specifically, an additional alkali supply flow rate h for pH control is first calculated from the deviation of absorption tower tank pH value C from a preset pH value P (P =5 to 6). Then, a total alkali supply flow rate (control target flow rate) QA (QA=QO+h) is calculated by adding this additional alkali supply flow rate h to a predetermined constant flow rate (preliminary alkali supply flow rate) QO.

The constant flow rate QO is initially set at a value which is determined in the design of the system by assuming the amount of impurities entering absorption tower 11 in the event of an unsteady operational state (or special operational state) as described above, and calculating a flow rate required to suppress the reduction in activity due to these impurities. If necessary, this constant flow rate QO may be finely adjusted on the spot.

With regard to additional alkali supply flow rate h, when absorption tower tank pH value C has fallen below the preset pH value (P=5 to 6), a value of additional alkali supply flow rate h corresponding to a proportional sensitivity is calculated and included in control target flow rate QA.

Figure 2:
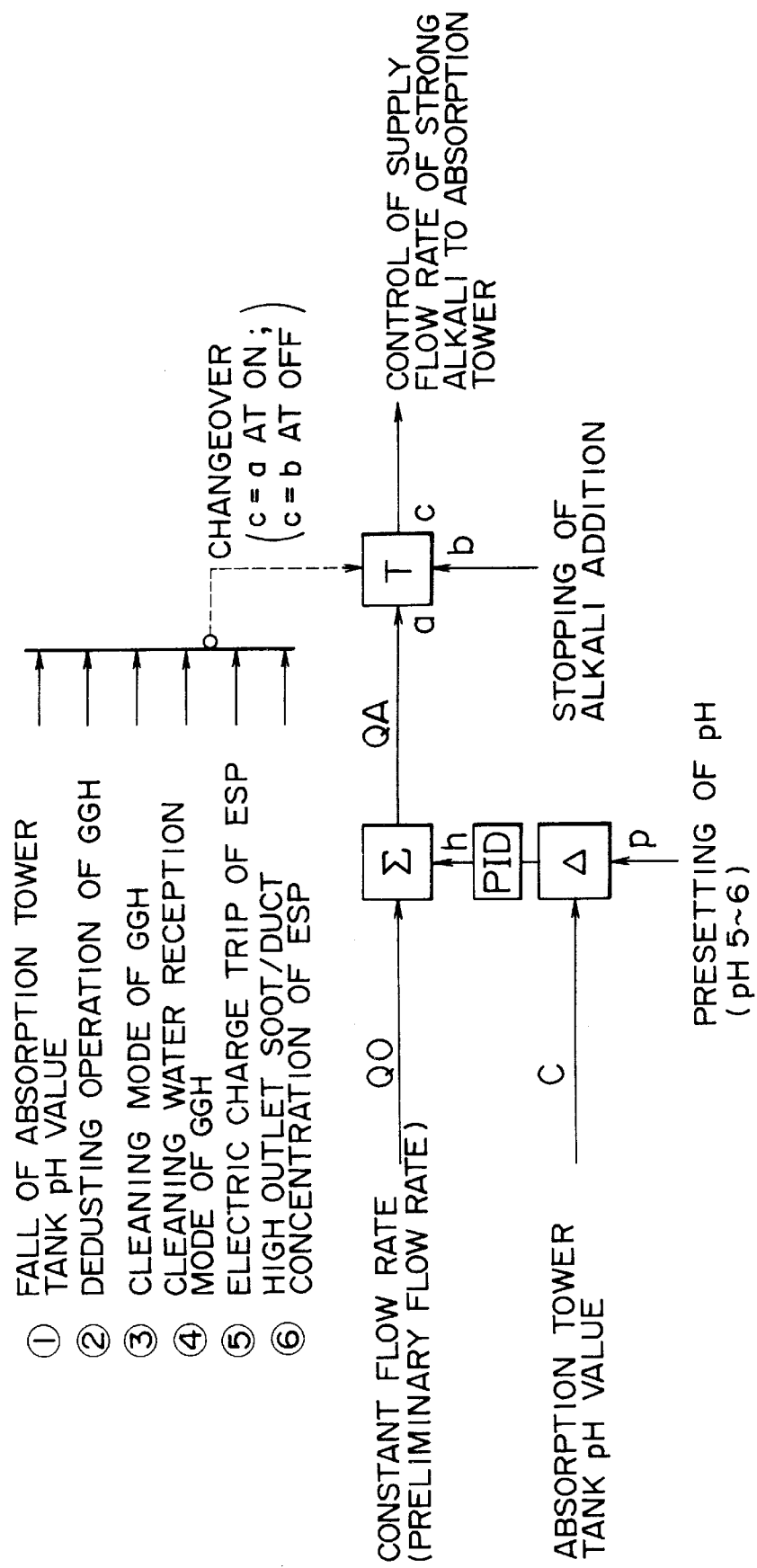
FIG. 2 is a diagram for explaining the functions of the alkaline agent addition control means used in the embodiment of FIG. 1.

As shown in FIG. 2, the addition of this control target flow rate QA is performed only when any one of the following conditions is satisfied. That is, the addition of the control target flow rate QA of the alkaline agent is performed under the control of addition control means 140 only when (1) absorption tower tank pH value C has fallen below the preset value P, (2) GGH is undergoing a dedusting operation, (3) GGH is operating in the cleaning mode, (4) GGH is operating in the cleaning water reception mode, (5) ESP (electrical dust precipitator 2) has stopped due to an electric charge trip, or (6) an abnormally high outlet soot/dust concentration of ESP is detected.

Absorbent feed rate regulation means 150 consists of the flow control valve 36 installed in the pipeline connecting slurry pump 28 for the supply of an absorbent slurry to tank 12 of absorption tower 11, and a driving device for driving flow control valve 36, such a solenoid or a combination of a compressed air source and a pneumatic actuator (not shown).

Feed rate control means 170 has the function of calculating the necessary feed rate of the absorbent (comprising limestone in this case) on the basis of a detection signal F from limestone concentration detection means 160, an output signal A from inlet concentration detector 39, and an output signal B from boiler load detector 40, and regulating the degree of opening of flow control valve 36 so that the feed rate of the absorbent slurry will correspond to the calculated value. For example, this feed rate control means 170 may consist of an arithmetic unit such as a microcomputer or a logic sequence circuit, and a driver circuit for applying a driving current to the driving device of feed rate regulation means 150 under the command of the arithmetic unit. In this feed rate control means 170, calculation of the feed rate of the absorbent is performed, for example, in the manner shown in FIG. 3.

Specifically, according to a predetermined function f, a basic absorbent feed rate f(x) based on the flow rate of sulfur dioxide is first calculated from a value x (x=A·B) obtained by multiplying inlet $SO_2$ concentration A by boiler load B. On the other hand, an additional absorbent feed rate i corresponding to a proportional sensitivity is calculated from the deviation of absorption tower tank limestone concentration F from a preset value DS of the limestone concentration. Then, a total absorbent flow rate defining a control target flow rate QG [QG=f(x)+i(F,DS)] is calculated by adding this additional absorbent feed rate i(F,DS) to basic absorbent feed rate f(x).

In this system, f(x) is defined, for example, as f(x)=a·x and the proportionality constant a is determined, for example, so that basic absorbent feed rate f(x) represents a stoichiometric equivalent of the absorbent which reacts with the amount of $SO_2$ determined from value x. With regard to additional absorbent feed rate i, for example, when absorption tower tank limestone concentration F has fallen below preset value DS, a value of additional absorbent feed rate i corresponding to a proportional sensitivity is calculated and included in control target flow rate QG. Preset value DS is previously determined on the basis of the minimum amount of limestone which should remain in tank 12 for the purpose of satisfactory reaction with sulfur dioxide when the activity of limestone is maintained.

Figure 3:
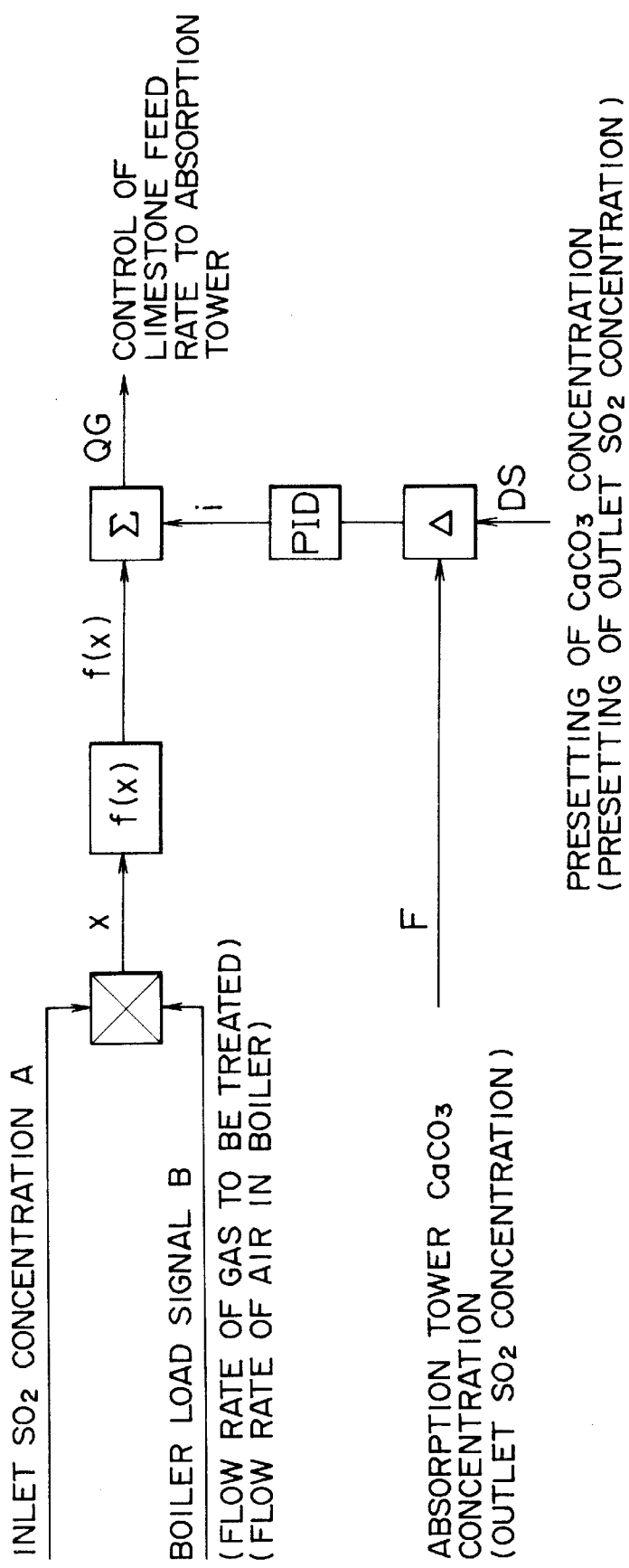
FIG. 3 is a diagram for explaining the functions of the absorbent feed rate control means used in the embodiment of FIG. 1.
Figure 4:
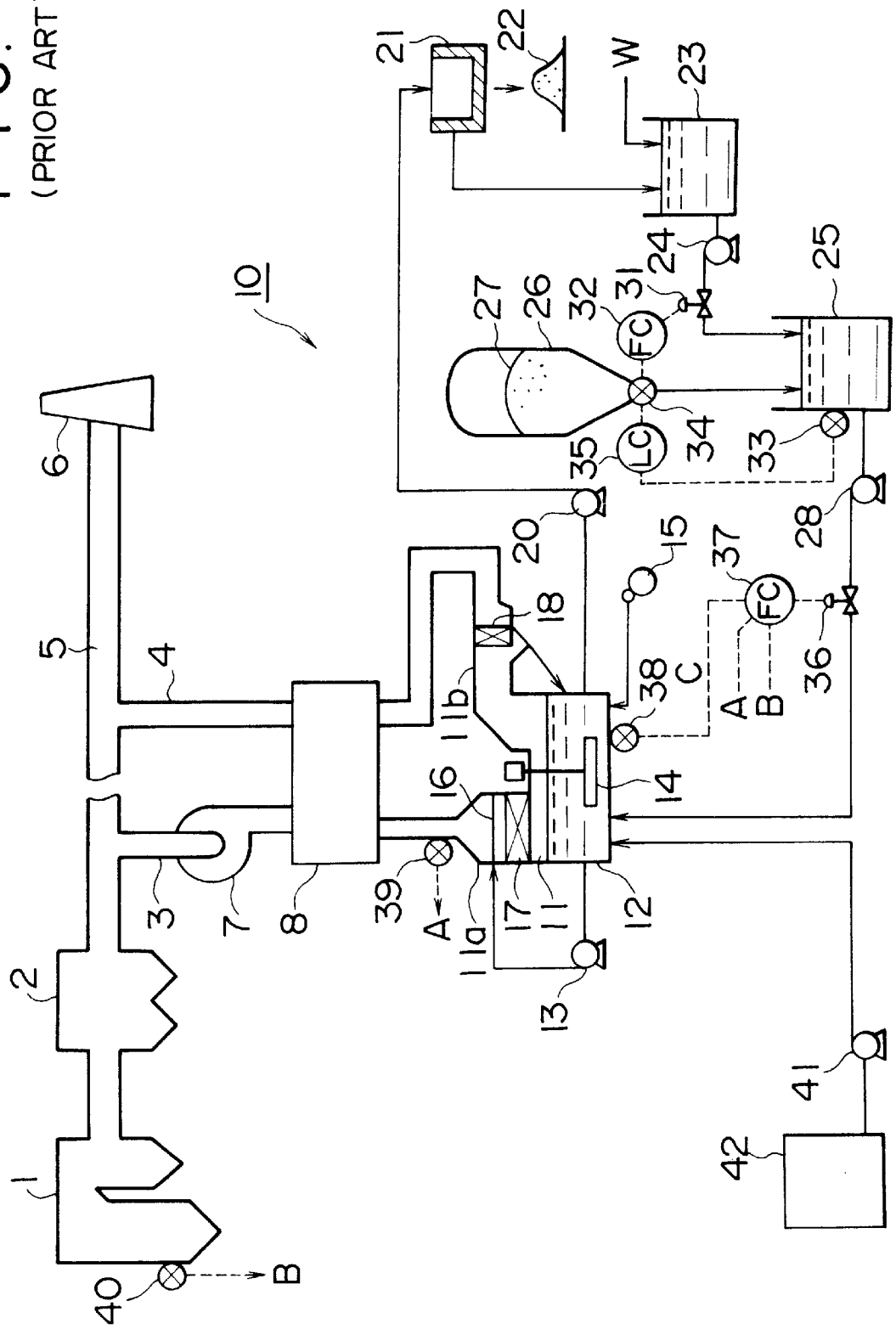
FIG. 4 is a schematic view illustrating the overall construction of an example of a conventional flue gas treating system.
Figure 5:
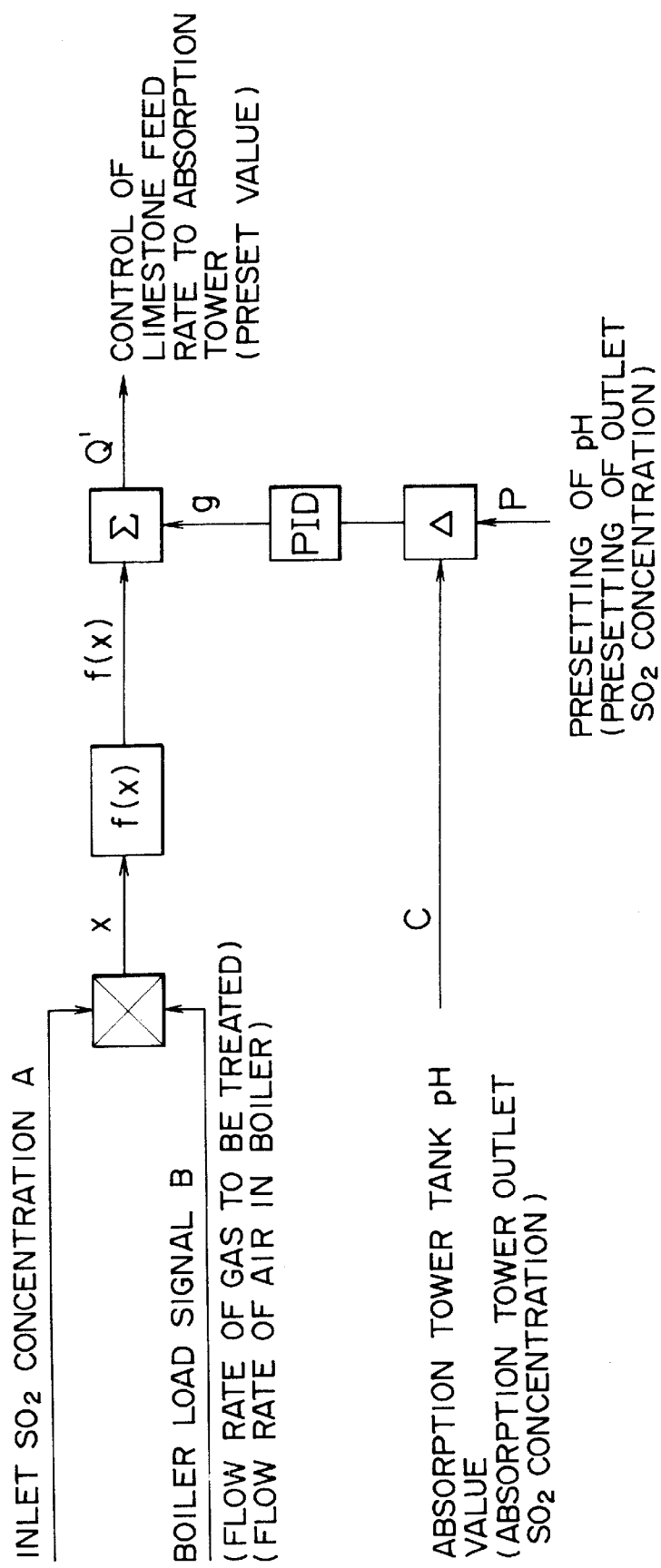
FIG. 5 is a diagram for explaining the functions of the absorbent feed rate control means used in the conventional flue gas treating system.

Alternatively, instead of being determined from the limestone concentration, additional absorbent feed rate i may be determined so that, as shown in parentheses in FIG. 3, the absorption tower outlet $SO_2$ concentration is maintained at a target value on the basis of the deviation of the detected value of the absorption tower outlet $SO_2$ concentration (the sulfur dioxide concentration of the treated flue gas) from a preset value. In this case, sulfur dioxide concentration detection means is installed as shown at 180 in FIG. 1, and an output signal G from this sulfur dioxide concentration detection means 180 is sent to feed rate control means 170.

In the flue gas treating system constructed in the above-described manner, when pH detector 38 detects that the pH of the slurry within absorption tower 11 has fallen below a preset target value (pH 5–6) or when GGH operational state detection means 120 or dust collector operational state detection means 130 detects that the operational state of GGH 8 or electrical dust precipitator 2 has become any one of the above-described unsteady operational states (or special operational states) (2)–(6) causing an increase in the amount of impurities present in the untreated flue gas entering absorption tower 11, addition means 110 for adding an alkaline agent to the slurry is instantaneously activated under the control of addition control means 140. Thus, at least a constant flow rate (or preliminary alkali supply flow rate) QO of the alkaline agent which has previously been determined in the design of soot/dust concentration is automatically added to the slurry until the pH of the slurry within absorption tower 11 rises to the target value and the unsteady operational state ceases. Moreover, if the pH of the slurry is below the target value, additional alkali supply flow rate h which is proportional to the fall thereof is additionally supplied.

Consequently, when the operational state of GGH 8 or electric dust precipitator 2 has become an unsteady operational state as described above, the addition of at least constant flow rate QO of the alkaline agent is started regardless of the pH value of the slurry within absorption tower 11. Thus, before the unsteady operational state causes a marked reduction in performance (i.e., before the pH of the slurry within absorption tower 11 or the $SO_2$ concentration at the outlet of absorption tower 11 shows a decreasing tendency), the alkaline agent is added in advance without rely on the judgment of the operator.

Similarly, when the pH of the slurry within absorption tower 11 has fallen below the target value, the addition of at least constant flow rate QO of the alkaline agent is also started regardless of the operational state of the GGH 8 or electrical dust precipitator 2. Moreover, in this case, additional alkali supply flow rate h which is proportional to the fall of the pH of the slurry is additionally supplied. Thus, even if a reduction in activity is caused by a factor other than the unsteady operational state (for example, an increase in the amount of impurities present in flue gas due to the type of fuel used or the like), the addition of the alkaline agent is automatically started as soon as the pH of the slurry within absorption tower 11 has fallen, without relying on the judgment of the operator. In this case, as the degree of fall of the pH value becomes greater, a larger amount of the alkaline agent is added.

Moreover, such addition of the alkaline agent is continued until the pH of the slurry within absorption tower 11 rises to the target value and the unsteady operational state ceases. Accordingly, no matter what is the factor causing the addition of the alkaline agent, the addition of the alkaline agent is surely continued as long as the condition requiring the addition of the alkaline agent exists.

Accordingly, if constant flow rate (preliminary alkali supply flow rate) QO forming a part of the supply flow rate of the alkaline agent is set at a necessary minimum level, it is possible to prevent at least a marked reduction in performance due to an unsteady operational state as described above while minimizing the required amount of the alkaline agent. Moreover, even if a reduction in performance is caused by a factor other than that, the alkaline agent is added as soon as the pH value of the slurry within the absorption tower has fallen. Thus, an acceptable performance level (or a state showing no significant reduction in performance) can be adequately maintained or a quick recovery of performance can be achieved.

Furthermore, the flue gas treating system of this embodiment is equipped with feed rate control means 170 which, when the value detected by limestone concentration detection means 160 for detecting the limestone concentration of the slurry within absorption tower 11 has exceeded a preset target value, controls limestone feed rate regulation means 150 to increase the feed rate of limestone until the detected value becomes equal to or less than the target value. Thus, the feed rate of the absorbent can always be maintained at a necessary minimum level on the basis of the limestone concentration of the slurry within absorption tower 11, independently of the pH value of the slurry within absorption tower 11.

That is, in the conventional system wherein the feed rate of the absorbent is regulated on the basis of the pH value of the slurry within tank 12 of absorption tower 11, a fall of the pH value of the slurry within tank 12 results in not only the addition of the alkaline agent, but also an unconditional increase in the feed rate of the absorbent. Consequently, if the fall of the pH value is not necessarily caused by a shortage of the absorbent, the absorbent will be supplied wastefully. This disadvantage can be overcome by controlling the feed rate of the absorbent on the basis of the limestone concentration of the slurry within absorption tower 11.

In this embodiment, therefore, the required amounts of the absorbent and the alkaline agent can be minimized to reduce the operation cost while maintaining high performance stably, and the quality of gypsum obtained as a by-product can be kept high.

It is to be understood that the present invention is not limited to the above-described embodiment, and various changes and modifications may be made therein. For example, the alkaline agent need not necessarily be added directly to the tank of the absorption tower, but may be added to the absorption slurry prior to supply to the absorption tower (i.e., to absorption slurry tank 25 in the above-described embodiment). GGH may be omitted in some cases. The absorption tower need not be of the grid type but may be, for example, of the liquid column type, and it is a matter of course that an oxidation tower may be installed separately.

In the flue gas treating system described in any one of the above paragraphs (1) to (3), it is possible to prevent at least a marked reduction in performance due to an unsteady operational state of the dust collector or GGH while minimizing the required amount of the alkaline agent. Moreover, even if a reduction in performance is caused by a factor other than that, the alkaline agent is added as soon as the pH value of the slurry within the absorption tower has fallen. Thus, an acceptable performance level (or a state showing no significant reduction in performance) can be adequately maintained or a quick recovery of performance can be achieved. Consequently, the required amount of the alkaline agent can be minimized to reduce the operation cost while maintaining a high degree of desulfurization stably.

Furthermore, in the flue gas treating system described in the above paragraphs (4) or (5), the feed rate of the absorbent can always be maintained at a necessary minimum level on the basis of the calcium compound concentration of the slurry within the absorption tower or the sulfur dioxide concentration of the treated flue gas, independently of the pH value of the slurry within the absorption tower.

That is, in the conventional system wherein the feed rate of the absorbent is regulated on the basis of the pH value of the absorption tower tank, a fall of the pH value of the absorption tower tank results in not only the addition of the alkaline agent, but also an unconditional increase in the feed rate of the absorbent. Consequently, if the fall of the pH value is not necessarily caused by a shortage of the absorbent, the absorbent will be supplied wastefully. This disadvantage can be overcome by controlling the feed rate of the absorbent on the basis of the calcium compound concentration of the slurry within the absorption tower or the sulfur dioxide concentration of the treated flue gas.

We claim:

1. A flue gas treating system comprising a gas-gas heater for heating the treated flue gas by use of the heat of untreated flue gas containing sulfur dioxide; and a wet flue gas desulfurization apparatus in which the flue gas leaving said gas-gas heater is introduced into an absorption tower and brought into contact with a calcium compound-containing slurry to remove the sulfur dioxide by absorption and form gypsum, said flue gas system further comprising:

addition means for adding an alkaline agent to the slurry;

a pH detector for detecting the pH of the slurry within said absorption tower;

gas-gas heater operational state detection means for detecting the operational state of said gas-gas heater; and alkaline agent addition control means for controlling the amount of alkaline agent added in response to signals from said pH detector and said gas-gas heater operational state detection means;

said alkaline agent addition control means configured so that when detection of the pH of the slurry within said absorption tower and of the operational state of said gas-gas heater reveals that the pH of the slurry has fallen below a preset target value or the operational state of said gas-gas heater has become an unsteady operational state causing an increase in the amount of impurities present in the untreated flue gas, at least a predetermined constant flow rate of the alkaline agent can be added to the slurry until the pH of the slurry rises to the target value and the unsteady operational state ceases.

2. A flue gas treating system comprising a dust collector for removing dust present in flue gas containing sulfur dioxide; and a wet flue gas desulfurization apparatus in which the flue gas dedusted by said dust collector is introduced into an absorption tower and brought into contact with a calcium compound-containing slurry to remove the sulfur dioxide by absorption and form gypsum, said flue gas system further comprising:

addition means for adding an alkaline agent to the slurry;

a pH detector for detecting the pH of the slurry within said absorption tower;

dust collector operational state detection means for detecting the operational state of said dust collector; and alkaline agent addition control means for controlling the amount of alkaline agent added in response to signals from said pH detector and said dust collector operational state detection means;

said alkaline agent addition control means configured so that when detection of the pH of the slurry within said absorption tower and of the operational state of said dust collector reveals that the pH of the slurry has fallen below a preset target value or the operational state of said dust collector has become an unsteady operational state causing an increase in the amount of impurities present in the untreated flue gas, at least a predetermined constant flow rate of the alkaline agent can be added to the slurry until the pH of the slurry rises to the target value and the unsteady operational state ceases.

3. A flue gas treating system comprising a gas-gas heater for heating the treated flue gas by use of the heat of untreated flue gas containing sulfur dioxide; a dust collector for removing dust present in the untreated flue gas; and a wet flue gas desulfurization apparatus in which the flue gas having passed through said gas-gas heater and said dust collector is introduced into an absorption tower and brought into contact with a calcium compound-containing slurry to remove the sulfur dioxide by absorption and form gypsum, said flue gas system further comprising:

addition means for adding an alkaline agent to the slurry;

a pH detector for detecting the pH of the slurry within said absorption tower;

gas-gas heater operational state detection means for detecting the operational state of said gas-gas heater;

dust collector operational state detection means for detecting the operational state of said dust collector; and alkaline agent addition control means for controlling the amount of alkaline agent added in response to signals from said pH detector, said gas-gas heater operational state detection means and said dust collector operational state detection means;

said alkaline agent addition control means configured so that when detection of the pH of the slurry within said absorption tower and of the operational states of said gas-gas heater and said dust collector reveals that the pH of the slurry has fallen below a preset target value or the operational state of said gas-gas heater and said dust collector has become an unsteady operational state causing an increase in the amount of impurities present in the untreated flue gas, at least a predetermined constant flow rate of the alkaline agent can be added to the slurry until the pH of the slurry rises to the target value and the unsteady operational state ceases.

4. A flue gas treating system as claimed in any one of claims 1 to 3 wherein said flue gas treating system is further equipped with feed rate regulation means for regulating the feed rate of the calcium compound contained in the slurry, calcium compound concentration detection means for detecting the calcium compound concentration of the slurry within said absorption tower, and calcium compound feed rate control means for controlling the feed rate of the calcium compound in response to a signal from said calcium compound concentration detection means, so that when the value detected by said calcium compound concentration detection means has fallen below a preset target value, the feed rate of the calcium compound can be increased until the detected value rises to the target value.

5. A flue gas treating system as claimed in any one of claims 1 to 3 wherein said flue gas treating system is further equipped with feed rate regulation means for regulating the feed rate of the calcium compound contained in the slurry, sulfur dioxide concentration detection means for detecting the sulfur dioxide concentration of the treated flue gas, and calcium compound feed rate control means for controlling the feed rate of the calcium compound in response to a signal from said sulfur dioxide concentration detection means, so that when the value detected by said sulfur dioxide concentration detection means has exceeded a preset target value, the feed rate of the calcium compound can be increased until the detected value becomes equal to or less than the target value.

* * * * *

UNITED STATES PATENT AND TRADEMARK OFFICE
CERTIFICATE OF CORRECTION

PATENT NO. : 5,770,161
DATED : June 23, 1998
INVENTOR(S) : Ochi et al.

It is certified that error appears in the above-identified patent and that said Letters Patent is hereby corrected as shown below:

On title page, item
[56] References Cited

Insert --5,605,552  2/1997   Shimizu et al.
        5,509,461  4/1996   Williams--

Signed and Sealed this

First Day of December, 1998

Attest:

BRUCE LEHMAN

Attesting Officer

Commissioner of Patents and Trademarks